United States Patent [19]

Hansen, Jr.

[11] 4,078,683

[45] Mar. 14, 1978

[54] MATERIAL HANDLING APPARATUS

[76] Inventor: Bobbie F. Hansen, Jr., 5395 N. Rolinda, Fresno, Calif. 93705

[21] Appl. No.: 724,295

[22] Filed: Sep. 20, 1976

[51] Int. Cl.² .......................................... B65G 65/04
[52] U.S. Cl. .................................................. 214/310
[58] Field of Search .............. 214/304, 302, 519, 310; 198/507, 511, 520, 692, 693, 493; 302/11, 12, 13

[56] References Cited

U.S. PATENT DOCUMENTS

| | | | |
|---|---|---|---|
| 1,642,287 | 9/1927 | Zuckerman | 198/520 |
| 2,627,159 | 2/1953 | Russell | 198/692 |
| 3,795,335 | 3/1974 | Hansen, Jr. | 214/302 |

Primary Examiner—Lawrence J. Oresky

[57] ABSTRACT

In a material handling apparatus for removing fruit from rolled penetrable trays wherein the apparatus has a conveyor assembly receiving the rolled trays at one end and discharging the fruit at the opposite end, a mechanism mounted on the apparatus above the conveyor assembly and having tines moving in an orbital path to penetrate the rolled trays and carry them upwardly from the conveyor assembly gravitationally to discharge the fruit onto the conveyor assembly, and a mechanism for removing the emptied trays from the tines, an improvement having the tine mechanism mounted for movement from the conveyor assembly upon the tines contacting an impenetrable object on the conveyor so as to protect the tines; and an air conducting assembly borne by the apparatus to prevent the escape of emptied trays from the apparatus at the discharge end of the conveyor.

6 Claims, 4 Drawing Figures

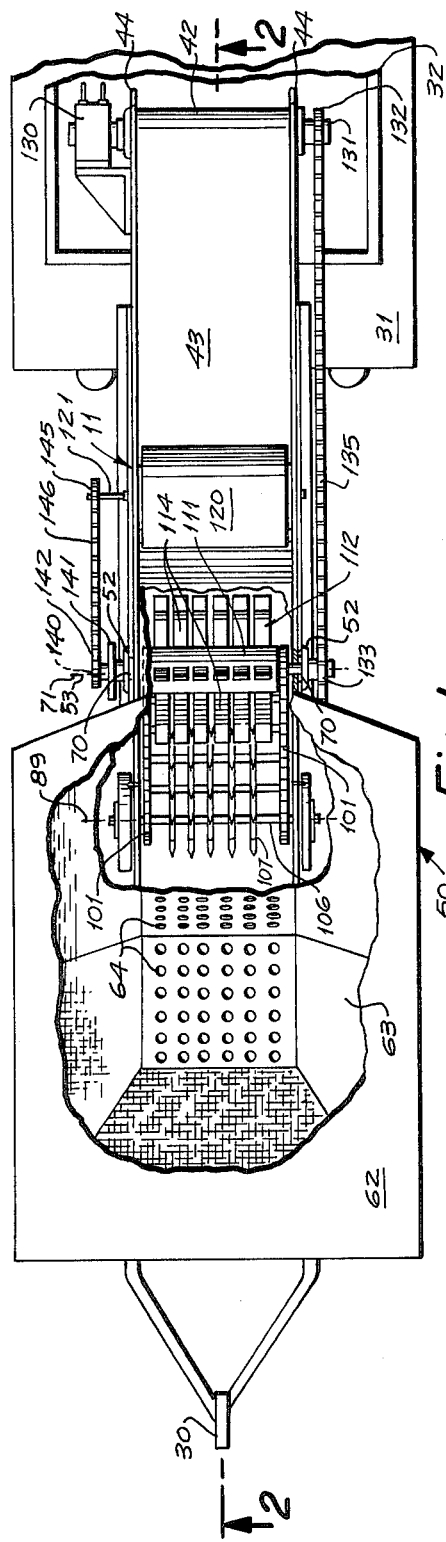
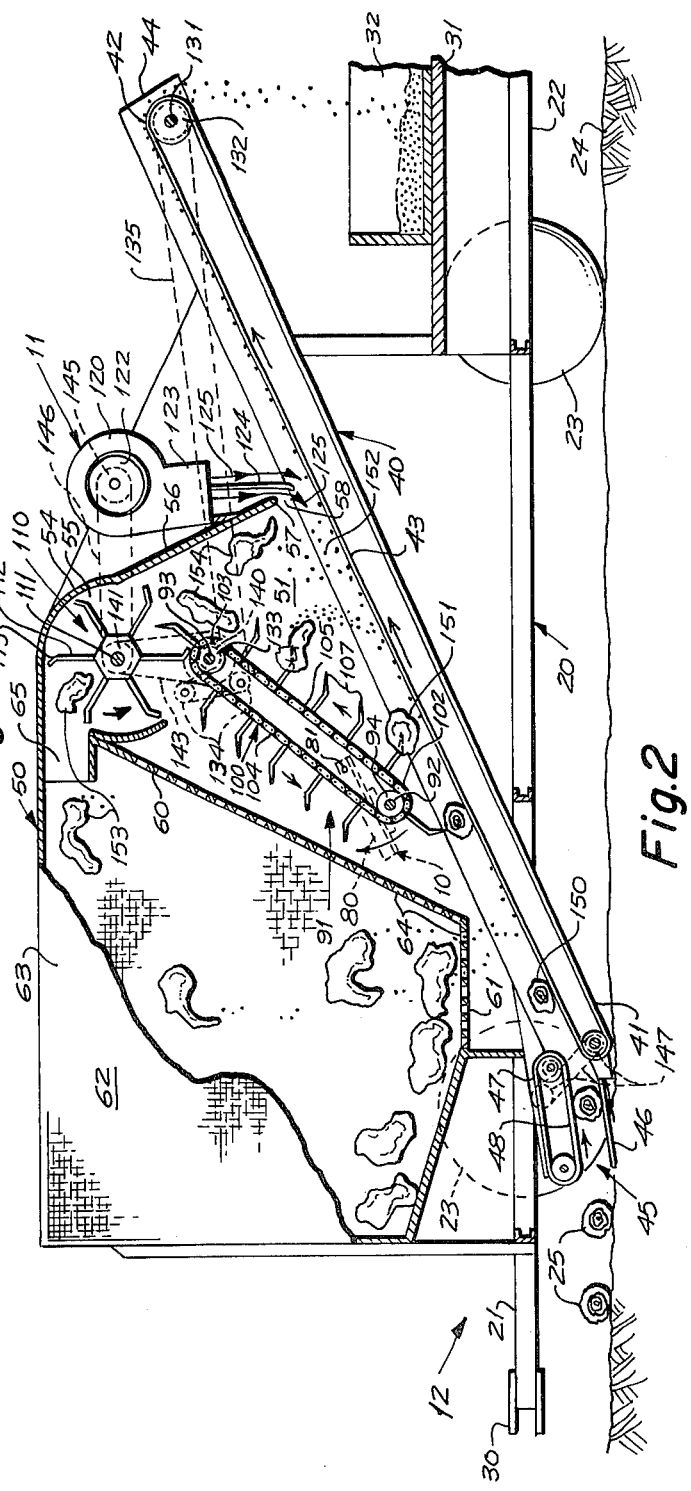
Fig.1
Fig.2

MATERIAL HANDLING APPARATUS

BACKGROUND OF THE INVENTION

1. Field Of The Invention

The present invention relates to a material handling apparatus and more particularly to an improvement in such an apparatus adopted to protect the apparatus from damage by extraneous materials and insure operation at maximum efficiency for the dependable separation of materials handled thereon.

2. Description Of The Prior Art

A wide variety of material handling machines have been developed for conveying and processing agricultural products. The applicant is the patentee of U.S. Pat. No. 3,795,335 entitled "Material Handling Apparatus". The apparatus of that patent operates automatically to pick up rolled paper trays containing dried fruit from the earth's surface, separate the trays and fruit, and deposite the trays and fruit in individual receptacles. This apparatus is the only such patented device known to the applicant.

Where agricultural equipment, such as that of the applicant's aforementioned patent, operate in the field, certain onerous difficulties are encountered. Typically the earth's surface has extraneous materials such as sticks, branches, rocks, stones and the like strewn thereover. Such materials may be inadvertantly picked up by agricultural equipment and can result in damage to such equipment. For example, in the applicant's patented apparatus the mechanism which grasps the trays may be damaged by such extraneous materials.

In material handling machines which process articles of uneven shapes and non-uniform size mixed with extraneous materials, it has in the past been difficult to provide a structure which is at once economical, simple to operate, easy to maintain, free from damage by extraneous materials, and yet provides perfect separation of mixed materials presented for separation on a production line basis. In regard to the applicant's patented apparatus it has been found difficult completely to eliminate the occasional delivery of emptied trays along with the dried fruit to the same receptacle.

Therefore, it has long been recognized that it would be desirable to have improvements in material handling apparatus which insure operation of such apparatus on a dependable and economical basis while affording a capability of discriminating between the materials to be handled and materials which are extraneous to the handling operation so as to avoid damage to the operative components thereof.

SUMMARY OF THE INVENTION

Therefore, it is an object of the present invention to provide improvements in a material handling apparatus.

Another object is to provide such an improvement in a material handling apparatus which assists in discriminating between materials to be handled and materials extraneous to the operation.

Another object is to provide such an improvement which operates to preclude damage to the operative components of a material handling apparatus by extraneous materials.

Another object is to provide an improved automatic material handling apparatus particularly suited to picking up dried friut, such as raisins, wrapped in rolled paper trays, from the earth's surface separating the fruit and the trays, and delivering them to separate receptacles.

Another object is to provide such an improvement which prevents unintended delivery of emptied trays and dried fruit to the same receptacle.

Another object is to provide such an improvement in a handling apparatus which precludes damage by impentrable objects.

Another object is to provide such an improvement in a handling apparatus which operates to insure that the apparatus requires minimum maintainence when used in the field for agricultural purposes.

A further object is to provide such an improvement in a handling apparatus which provides effective separation of the fruit and trays on a production line basis with minimum attention despite the presence of extraneous materials in the input stream.

Further objects and advantages are to provide improved elements and arrangements thereof in an apparatus for the purposes described which is dependable, economical, durable, and fully effective in accomplishing its intended purposes.

BRIEF DESCRIPTION OF THE DRAWINGS

FIG. 1 is a fragmentary top plan view of a material handling apparatus having the improvement of the principles of the present invention.

FIG. 2 is a fragmentary longitudinal vertical section taken on line 2—2 in FIG. 1 illustrating the operation of the apparatus having the improvement.

DESCRIPTION OF THE PREFERRED EMBODIMENT

Figure 3:
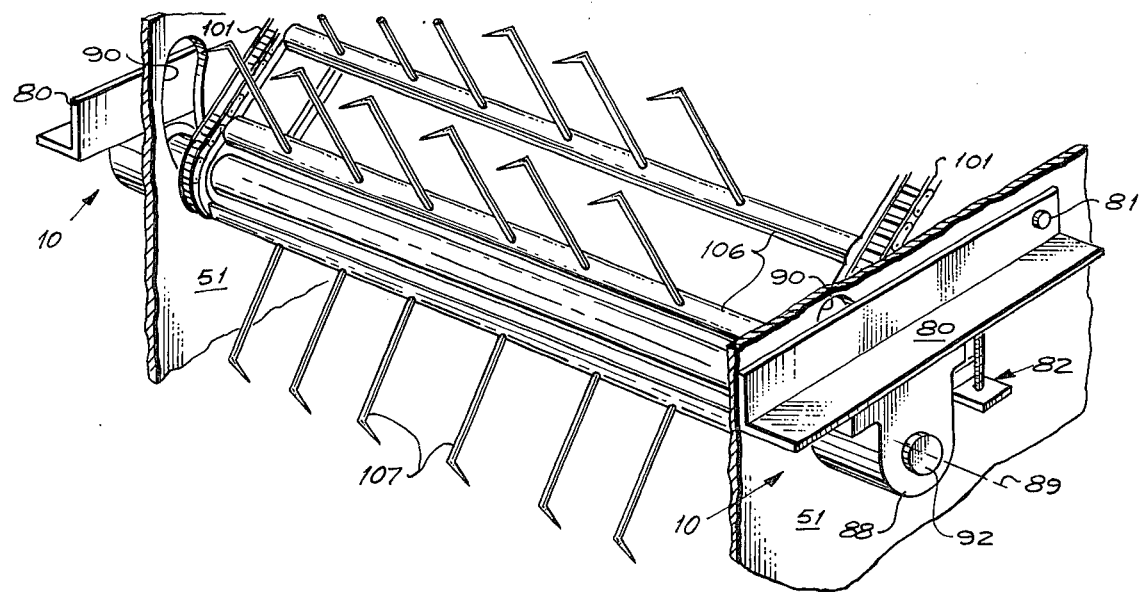
FIG. 3 is a somewhat enlarged, fragmentary perspective view of the apparatus of FIGS. 1 and 2 showing a portion of the improvement therein.

The improvement of the present invention is adapted for use on a variety of types of material handling apparatus. The form of material handling apparatus shown and described herein is used for illustrative convenience and constitutes a suitable environment for the improvement of the present invention. The improvement hereof was conceived and designed for use on the material handling apparatus of the applicant's aforementioned U.S. Pat. No. 3,795,335. Preferably the improvement is manufactured as an integral component of the material handling apparatus on which it is to operate. Alternatively, it can be mounted on existing machines as a subsequent modification.

The improvement of the present invention encompasses several structural changes and additions in the specific apparatus on which is is to operate. The improvement has a tine protecting portion generally indicated by the numeral 10 in FIG. 2 and has a tray containment portion generally indicated by the numeral 11.

A representative material handling apparatus is indicated generally by the numeral 12 and is similar to that of the applicant's U.S. Pat. No. 3,795,335. Reference is made to that patent for further details in relation to the apparatus thereof. The material handling apparatus 12 has an elongated frame 20 having a forward portion 21 and a rearward portion 22. Ground wheels 23 are mounted for rotational movement on the frame and support the machine for earth traversing movement upon a ground surface 24 having rolled trays 25 containing raisins. The rolled trays are disposed on the ground surface in rows in accordance with customary practice.

A hitch 30 is affixed on the forward portion 21 of the frame 20 and adapted for use in pulling the material handling apparatus 12. A horizontal platform 31 is secured on the rearward portion 21 of the frame and serves to support sweat boxes 32 for purposes subsequently to be described.

A first conveyor assembly 40 is borne by the frame 20 and has a forward or receiving end 41, an opposite rearward or delivery end 42, and an upper run 43. The said first conveyor assembly is mounted on the frame with its forward end disposed so as to be closely adjacent to the ground surface 24 and its discharge end is mounted in spaced relation to and above the platform 31 on the rearward portion 22 of the frame. The first conveyor assembly has upwardly extending sides or skirt boards 44 extending from the forward to the rearward end of the conveyor assembly. A draper assembly 45 is secured on the frame at the forward end of the first conveyor assembly. The draper assembly has a forked ramp 46 mounted on the frame for sliding movement over the ground surface in feeding relation to the forward end of the conveyor assembly. The draper assembly has an endless belt 47 mounted on the frame in spaced relation to and above the draper. The endless belt has a lower run 48 adapted to be driven in a rearward direction to motivate successive rolled trays 25 over the forked ramp and onto the forward end of the conveyor assembly, as can best be seen in FIG. 2.

The material handling apparatus 12 has a housing 50 borne by the frame 20 above the first conveyor assembly 40. The housing has longitudinal side walls 51 secured on the frame on opposite sides of and adjacent to the first conveyor assembly. A first pair 52 of bearings are individually mounted on the opposite side walls of the housing adjacent to the top of the housing. The bearings are aligned to define an axis 53 extending transversely of the apparatus and horizontally disposed. The housing has an upper portion 54 which is disposed in predetermined spaced relation from and substantially concentric to the axis 53. The side wall 51 and upper portion of the housing form a substantially cylindrical interior 55. The housing has a rearward wall 56 mounted on and interconnecting the side walls and upper portion of the housing and extending downwardly and rearwardly from the upper portion of the housing to a lower edge 57. The edge 57 of the rearward wall is spaced from and above the first conveyor assembly to define, together with the side walls 51, an air opening 58 above the upper run 43 of the first conveyor assembly.

The housing 50 has a forward wall 60 mounted on and interconnecting the side walls 51. The forward wall extends from the upper portion 54 of the housing generally downwardly and forwardly toward the forward end of the first conveyor assembly 40. The forward wall has a forward portion 61 mounted thereon which extends substantially horizontally over the forward end 41 of the conveyor assembly. A cage structure 62 is affixed on the forward wall of the housing forming a hopper or receptacle 63. The forward wall 60 of the housing is common to both the housing 50 and the receptacle and has perforations 64 therein for communication therebetween. An exhaust duct discharge opening 65 is mounted on the housing and communicates at its opposite ends with, respectively, the upper portion of the receptable 63 and the cylindrical interior 55 of the upper portion 54 of the housing.

The housing 50 has a pair of second bearings 70 individually mounted on the side walls 51. The second bearings are mounted so as to define an axis 71 extending transversely of the apparatus in predetermined spaced relation to and below the axis 53. The axes 53 and 71 are substantially parallel to each other.

Figure 4:
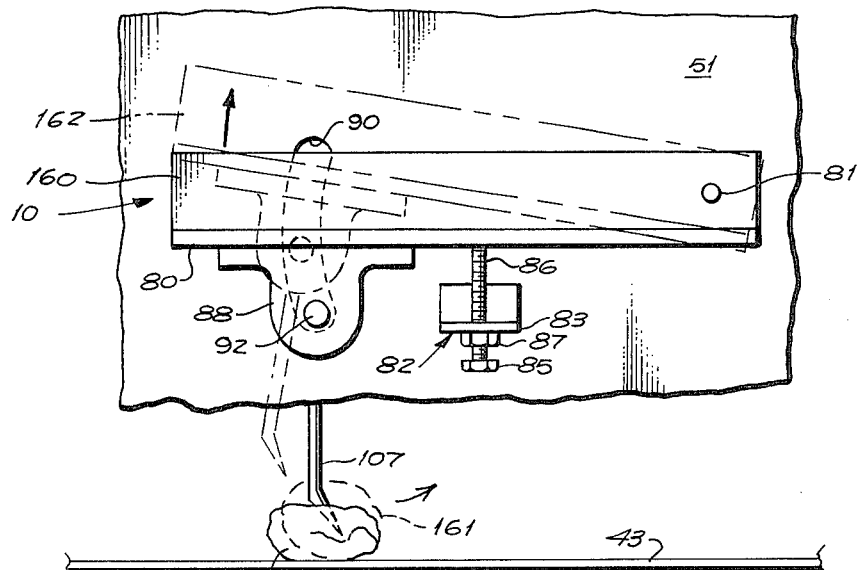
FIG. 4 is a fragmentary side elevation of the apparatus showing the improvement of FIG. 3 with the normal operative attitude shown in full lines and the position taken in response to contact with an impenetrable object shown in dashed lines. The view has been rotated from its actual operative orientation as viewed in FIGS. 1, 2 and 3 for purposes of illustrative convenience.

A pair of arms 80 are individually pivotally mounted on pivot mounts 81 on the side walls 51 of the housing 50. The mounts 81 are the arms borne thereby are secured on the side walls forwardly and downwardly from the axis 71 and in predetermined spaced relation to the upper run 43 of the first conveyor assembly 40, as best shown in FIGS. 2 and 4. A stop assembly 82 is secured on each of the side walls 51 to engage the under side of the arm pivotally mounted on that side wall. Each stop assembly has a horizontal plate 83 affixed on the side wall. A setscrew or bolt 84 is screwthreadably extended through each plate and has a head end 85 and an upper end 86. A locknut 87 is screwthreadably received on the setscrew between the head and the plate and is engageable in abutting relation with the underside of the plate to lock the setscrew in a selected position on the plate 83. As can best be visualized in FIG. 2, the stop assembly is adjustable to dispose the upper end of the setscrew in engagement with the underside of its respective arm. The upper end of the setscrew thus defines a lower and rearward limit for movement of its respective arm. The stop assemblies are preferably adjusted to retain the arms at the angle shown in FIG. 2 extending downwardly and forwardly toward the forward end 41 of the first conveyor assembly 41.

A pair of bearings 88 are individually mounted on the arms 80 forwardly of the pivot mounts and define a third axis 89 extending transversely of the apparatus 12 in a horizontal attitude. The side walls 51 individually have arcuate slots 90 therein configured to conform to the path of travel of the third axis 89 described by pivotal movement of the arms 80.

The material handling apparatus 12 has a tray emptying mechanism or second conveyor assembly 91 mounted on the housing 50, as best shown in FIG. 2. The tray emptying mechanism has a lower shaft 92 rotationally received in the pair of bearings 88. The mechanism 91 has an upper shaft 93 rotationally received in the second pair of bearings 70. The shafts 92 and 93 each have a pair of sprockets 94 affixed thereon in spaced relation within and individually adjacent to the side walls 51 of the housing 50.

The tray emptying mechanism 91 has a conveyor 100 formed by a pair of endless chains 101 extended about and engaged on the sprockets 94, as shown in FIGS. 1 and 2. The conveyor 100 has a forward or grasping portion 102, adjacent to the lower shaft 92, and a rearward or discharge portion 103, adjacent to the upper shaft 93. The conveyor 100 has an upper run 104 and a lower run 105 upwardly and rearwardly divergent from the upper run 43 of the first conveyor assembly 40. As best shown in FIG. 3, the conveyor 100 has a plurality of bars 106 mounted on and interconnecting the chains 101 in uniformly spaced relation extending transversely of the conveyor 100 throughout the entire run of the conveyor. Each of the bars has a plurality of grasping members or tines 107 mounted thereon in spaced relation and extending outwardly from the conveyor 100, as best shown in FIGS. 2 and 3. Operation of the conveyor, as will hereinafter be described, carries the distal ends of the tines in a path closely approaching the upper run 43 of the first conveyor assembly 40, at the grasping portion 102 of the conveyor. The tines are motivated with the conveyor along its lower run 105 in rearwardly divergent relation from the upper run 43 of the first conveyor assembly 40, as best shown in FIG. 2.

The material handling apparatus 12 has a stripping mechanism or fan 110 best shown in FIGS. 1 and 2. The stripping mechanism has a shaft 111 rotationally received in the first pair of bearings 52 mounted in the side walls 51 of the housing 50. The stripping mechanism has radially extending paddles 112 mounted on the shaft 111. The distal ends of the paddles are adapted to travel in a circular path which passes closely adjacent to the discharge portion 103 of the conveyor 100. The paddles are disposed in rows 113 extending longitudinally of the shaft. The paddles of each row are spaced to form interstices 114 for the passage of the tines 107 of the conveyor 100 therebetween in meshing relation as shown in FIG. 1.

The tray containment portion 11 of the improvement of the present invention has a fan 120 mounted on the rearward wall 56 of the housing 50 above the air opening 58. The fan has a drive shaft 121, an air intake opening 122 and an outlet duct 123. A baffle plate 124 is mounted on the exhaust duct of the fan and curved toward the air opening 58. As indicated by the arrows 125, the baffle plate directs air from the exhaust duct, during operation of the fan, toward the air opening 58.

As shown in FIG. 1 a material handling apparatus 12 has a drive motor 130 mounted on the frame 20 adjacent to the rearward end 42 of the first conveyor assembly 40 and has a drive shaft 131 extending through and in driving relation to the rearward end of the first conveyor assembly. A sprocket 132 is affixed on the drive shaft remote from the drive motor on the opposite side of the first conveyor assembly. A sprocket 133 is borne by the upper shaft 93 of the tray emptying mechanism 91 on the end thereof located on the same side of the apparatus as sprocket 132 and in alignment therewith longitudinally of the apparatus. A pair of idler sprockets 134, as best shown in FIG. 2, are mounted on the side wall 51 of the housing 50 for rotational movement in predetermined close proximity to the sprocket 133. A first drive chain 135 is extended about and thus links sprockets 132, 133 and 134 in driving relation, as shown in in FIG. 2. Thus, it will be seen that drive motor 130 is operated to drive first conveyor assembly 40 in a clockwise direction and the tray emptying mechanism 91 in a counter clockwise direction, as viewed in FIG. 2.

As shown in FIGS. 1 and 2, a sprocket 140 is mounted on the upper shaft 93 of the tray emptying mechanism 91 on the end of the shaft located on the same side of the material handling apparatus 12 as the drive motor 130. Two sprockets 141 and 142 are secured on the stripping mechanism shaft 111 on the same side of the apparatus 12 as the drive motor 130. Sprocket 141 is mounted on the shaft 111 in vertical alignment with the sprocket 140 on the shaft 93. Sprocket 142 is mounted on shaft 111 outwardly of the sprocket 141. A second drive chain 143 links the sprockets 140 and 141 for rotational movement of both shafts 93 and 111 in counter clockwise directions as viewed in FIG. 2. A sprocket 145 is fastened on the shaft 121 of the stripping mechanism 110. A third drive chain 146 is extended about and thus links in driving relation the sprockets 142 and 145 for driving of the fan 120. A chain and sprocket assembly 147 operably interconnects the forward end 41 of the first conveyor assembly 40 and the draper assembly 45, as shown in FIG. 2. Thus, the operation of the first conveyor assembly 40 in the clockwise direction as viewed in FIG. 2 causes the endless belt 47 of the draper assembly to be rotated in a counter clockwise direction as viewed in FIG. 2. Accordingly, the lower runs 48 of the belt operates to feed rolled trays of raisins up the forked ramp 46 and onto the upper run 43 of the first conveyor assembly.

For illustrative convenience as shown in FIGS. 2 and 4, rolled trays 25 are indicated at 150 being conveyed by the first conveyor assembly 40. A tray indicated at 151, is shown impaled by the tines 107 mounted on the conveyor 100 of the tray emptying mechanism 91. Raisins indicated at 152, are shown being emptied from the trays and falling onto the upper run 43 of the first conveyor assembly. Other trays from which the raisins have been emptied are indicated at 153 being placed in the receptacle 63 by the stripping mechanism 110. Still other trays, indicated at 154, which have become disengaged from the tines 107 without being discharged into the receptacle 63 are shown within the housing 50 between the tray emptying mechanism and the rearward wall 56 of the housing.

For illustrative convenience as shown in FIG. 4, the arms 80, on which the grasping portion 102 of the conveyor 100 of the tray emptying mechanism 91 is mounted, are gravitationally urged into a lower position 160 engaging the setscrew 84 of the stop assembly 82. An impenetrable or extraneous object 161, such as a rock, indicated in dashed lines in FIG. 4 is shown deflecting the tines 107 and the arms 80 into an upper or deflected position 162, spaced from the first conveyor assembly 40.

OPERATION

The operation of the described embodiment of the subject invention is believed to be clearly apparent and is briefly summarized at this point. The material handling machine 12 having the tine protecting portion 10 and tray containment portion 11 of the improvement of the present invention is drawn by the hitch 30, using a tractor or other suitable means of conveyance, over the ground surface 24 in longitudinal alignment with a row of rolled raisin trays 25. Simultaneously, the drive motor 130 is operated to rotate the drive shaft 131 in a clockwise direction as viewed in FIG. 2, causing the upper run 43 of the first conveyor assembly 40 to move from the forward end 41 of the conveyor assembly to the delivery end 42 of the conveyor assembly.

The draper assembly 45 is driven by the chain and sprocket assembly 147 from the forward end 41 of the first conveyor assembly 40. The lower run 48 of the draper assembly is driven in the same direction as and in feeding relation to the upper run 43 of the first conveyor assembly.

The conveyor 100 of the tray emptying mechanism 91 is driven in a counter clockwise direction as viewed in FIG. 2. The upper shaft 93 of the tray emptying mechanism is driven by the first drive chain 135. The chain 135 is driven from the sprocket 132 and drive shaft 131 of the first conveyor assembly 40. The relationship of the sprockets 132 and 133 and chain 135 is such that the lower run 105 of the conveyor 100 is moved from the forward or grasping end 102 thereof to the discharge end 103 thereof at a somewhat greater velocity than the movement of the upper run 43 of the first conveyor 40.

The stripping mechanism 110 is rotated by the second drive chain 143 from the upper shaft 93 of the tray emptying mechanism 91 in a counter clockwise direction, as shown in FIG. 2. The paddles 112 of the stripping mechanism 110 are thus transported in a counter clockwise direction as viewed in FIG. 2. As can be seen in FIGS. 1 and 2, the position of the paddles 112 of the stripping mechanism relative to the tines 107 of the tray emptying mechanism 91 are such that the tines are individually carried through the interstices 114 between the paddles at the point of closest approach of the distal ends of the paddles to the discharge portion 103 of the conveyor 100. The rotation of the stripping mechanism 110 in the described direction also causes the paddles to create air movement toward the exhaust duct 65.

The drive shaft 121 of the fan 120 of the tray containment portion 11 of the invention is driven by the third drive chain 146 from the shaft 111 of the stripping mechanism 110. So operated, the fan draws air in the intake opening 122 and discharges the air through the outlet duct 123 in the direction of the air opening 58. The baffle plate 124 operates to direct the air flow into the air opening as indicated by the arrows 125.

As the material handling machine 12 is drawn along a row of rolled raisin trays 25, the forked ramp 46 of the draper assembly 45 slides under each successive rolled tray lifting it from the ground surface 24. The lower run 48 of the endless belt 47 above the draper assembly assists in transporting each successive tray through the draper assembly and onto the forward end 41 of the first conveyor assembly 40. The first conveyor assembly 40 carries the rolled trays toward the grasping portion 102 of the conveyor 100 of the tray emptying mechanism 91.

As a rolled tray 25 approaches the grasping portion 102 of the conveyor 100 of the tray emptying mechanism 91, the distal ends of the tines 107 engage the rolled trays. The trays are impaled by the tines 107 and are subsequently lifted from the upper run 43 of the first conveyor assembly 40 as the path of the tines borne by the lower run 105 of the conveyor 100 diverges from the first conveyor assembly during movement in the counter clockwise direction, as viewed in FIG. 2.

As occasionally may occur, the draper assembly 45 may pick up extraneous materials such as rocks, wood, metal and the like during operation. Where such as extraneous, impenetrable object 161 is picked up by the material handling apparatus 12, it frequently will be carried by the first conveyor assembly 40 into the path of the tines 107. Where this occurs, the tine protecting portion 10 of the apparatus 12 operates to protect the apparatus from damage. Since the conveyor 100 is rotated at a somewhat faster speed than the conveyor assembly 40, the tines are brought forcefully into contact with the object 161. As can best be visualized in FIG. 4, the force of the contact causes the force to be transmitted through the tines 107 and grasping portion 102 of the conveyor to the arms 80 upon which the graspng portion of the conveyor is mounted. This force exerted on the arms causes them to be pivoted about their pivot mounts 80 from their normal, lower positions 160 toward their upper positions 162 carrying the grasping portion 102 of the conveyor 100. The tines 107 are thus deflected from the object 161. Since the tines are transported at a faster speed than the object 161 on the conveyor 40 and since the tines follow a path divergent from the upper run 43 of the conveyor 40, the tines, in effect, are bounced over the object 161 thereby avoiding damage to the tines or jamming of the apparatus. Yet the arms 80 and thus the grasping portion 102 of the conveyor 100 are rapidly, gravitationally returned to the normal, lower position in rested engagement with the setscrews 84 so that subsequent tines impale rolled trays which follow the object 161 on the conveyor. The optimum lower position 102 may adjustably be determined by longitudinal screwthreaded adjustment of the setscrews in their respective horizontal plates 83. The adjusted position can then be fixed by tightening the locknut 87 into engagement with the horizontal plate.

As shown in FIG. 2, as rolled raisin trays 25 which have been penetrated by the tines 107 of the tray emptying mechanism 90 are lifted by the tines from the first conveyor assembly 40, the weight of the raisins within the rolled trays gravitationally unrolls the trays so as to discharge the raisins onto the upper run 43 of the first conveyor assembly 40. The trays, however, remain impaled on the tines. The raisins discharged from the trays are subsequently carried on the upper run of the first conveyor assembly toward the rearward end 42 thereof. The raisins are gravitationally discharged from the rearward end 42 into a sweat box 32 disposed on the horizontal platform 31.

Simultaneously, the trays 151 which have been impaled by the tines 107 and gravitationally unrolled to discharge their raisins are borne toward the discharge portion 103 of the tray emptying conveyor 100. When the unrolled trays reach the discharge portion, the trays are pulled from the tines by the paddles 112 of the stripping mechanism 110 as the paddles pass between the tines. Subsequently, the rotational movement of the stripping fan and the air flow induced by its movement cause the trays to be forced through the exhaust duct 65 into the receptacle 63 for subsequent disposal. Any raisins not discharged from the trays before the trays are discharged into the receptacle fall through the perforations 64 in the forward wall 60 of the housing 50 and onto the first conveyor assembly 40 for subsequent delivery to a sweat box 32 as previously described.

In certain instances trays, such as indicated at 154, become disengaged from the tines 107 without being discharged into the receptacle 63. The tray containment portion 11 of the invention prevents such trays from escaping from the housing 50 through the air opening 58 in the rearward wall 56 of the housing by directing a flow of air indicated by the arrows 125 from the fan 120 into the opening. The flow of air is directed toward the air opening by the baffle plate 124 causing the trays 154, whether being borne by the first conveyor 40 or falling toward it within the housing, to be carried by a current of air from the air opening toward the stripping mechanism 110 for subsequent deposit in the receptacle 63.

Therefore, the improvement in a material handling apparatus of the present invention insures dependable and economical operation of such apparatus by providing the capability of discriminating between materials to be handled and materials which are extraneous to the handling operation so as to avoid damage to the operative components of the apparatus and by providing the capability of insuring that the materials handled are directed to the proper locations.

Although the invention has been shown and described in what is conceived to be the most practical and preferred method and apparatus, it is recognized that departures may be made therefrom within the scope of the invention, which is not to be limited to the illustrative details disclosed.

Having described my invention what I claim as new and desire to secure by Letters Patent is:

1. In an apparatus for removing fruit from rolled trays of fruit in which the apparatus has a frame; a conveyor assembly mounted on the frame having an end for receving the rolled trays of fruit and an opposite end to which the fruit removed from the trays is delivered; a tray emptying mechanism mounted on the frame adjacent to the conveyor having an orbital path of movement which approaches said conveyor assembly at a first position and then diverges from said conveyor assembly to a second position; a plurality of tines mounted on the mechanism for movement along said path to impale the trays in the first position; a stripping mechanism mounted on the frame adjacent to the second position for removing trays from the tines; a housing mounted on the frame enclosing a portion of the conveyor assembly and the stripping mechanism and having an opening from which said opposite end of the conveyor assembly extends; an improvement comprising means mounting the mechanism in the first position for movement from the conveyor assembly upon the tines contacting an impenetrable object; and means for conducting air toward said opening of the housing to prevent the escape of trays from the housing.

2. The improvement of claim 1 wherein the apparatus has a receptacle mounted on the frame in communication with the housing in receiving relation to trays removed by the stripping mechanism and the air conducting means of the improvement has a baffle plate positioned to direct air into the opening of the housing to create a path of air movement within the housing generally toward the stripping mechanism and into the receptacle.

3. In an apparatus for picking up rolled trays of raisins and removing the raisins from the trays wherein the apparatus has a frame adapted for earth traversing movement in a predetermined direction along a row of said rolled trays; a conveyor assembly mounted on the frame having forward and rearward portions relative to said direction of travel, said conveyor assembly being adapted to pick up said rolled trays at its forward portion and move them toward its rearward portion; an emptying mechanism mounted on the frame above the conveyor assembly intermediate its forward and rearward portions adapted to pick up rolled trays of raisins from the conveyor assembly and gravitationally to discharge the raisins contained in the trays onto the conveyor assembly; a receptacle; means for removing emptied trays from the emptying mechanism and depositing said trays in the receptacle; a housing secured on the frame to enclose said emptying mechanism and the intermediate portion of the conveyor assembly and having an air opening through which the conveyor assembly extends to its rearward portion; an improvement comprising means mounted on the frame externally of the housing for directing a flow of air into the air opening of the housing to preclude the escape of trays from the housing therethrough.

4. In an apparatus for picking up rolled trays of raisins and removing the raisins from the trays wherein the apparatus has a frame adapted for earth traversing movement in a predetermined direction of travel along a row of said rolled trays; a conveyor assembly mounted on the frame having forward and rearward portions relative to said direction of travel and an upper run adapted for movement along a path of travel from the forward to the rearward portion thereof; a second conveyor assembly, having opposite grasping and discharge portions and a lower run, mounted on the frame above the first conveyor assembly with the grasping portion of the second conveyor assembly nearest the first conveyor assembly with the lower run of the second conveyor assembly upwardly divergent from the upper run of the first conveyor assembly; a plurality of tray engaging members borne by the second conveyor assembly in outward extension therefrom toward the first conveyor assembly in passage with the lower run of the second conveyor assembly; means mounted on the frame for driving the first and second conveyor assemblies; a stripping mechanism on the apparatus adjacent to the discharging portion of the second conveyor assembly to remove the trays from the tray engaging members and a housing mounted on the frame enclosing the stripping mechanism and second conveyor assembly and having an air opening therein remote from and below the discharge portion of the second conveyor assembly; an improvement comprising a pair of arms individually pivotally mounted on the frame on opposite sides of the grasping portion of the second conveyor assembly; a pair of bearings individually affixed on the arms defining an axis of rotation extending between the arms; a shaft and sprocket assembly received in the bearings with the grasping portion of the second conveyor assembly extended thereabout; a stop assembly mounted on the frame and adjustably engageable by one of said arms in a lower position for said grasping portion and upwardly from which the grasping portion of the second conveyor assembly can be moved by deflecting engagement of the tray engaging members with extraneous objects on said first conveyor assembly and a fan mounted on the apparatus externally of the housing operable to direct air into the air opening to preclude the escape of trays through the air opening.

5. In an apparatus for removing raisins and the like from paper trays and the like, a conveyor having a receiving end and a delivery end, means for delivering trays containing raisins to the receiving end of the conveyor, means for removing said trays from the conveyor while discharging the raisins contained thereby onto the conveyor, a housing enclosing the tray removing means having an opening through which the trays containing raisins are received and an opposite opening through which the delivery end of the conveyor is extended and through which the raisins are transported by the conveyor, and a fan mounted on the apparatus externally of the housing operable to direct air into said opposite opening to preclude the escape of trays through said opposite opening.

6. The apparatus of claim 5 in which the housing has an opening for the discharge of air and air borne trays, and including a cage connected to the discharge opening to release the current of air therethrough the accumulate the trays.

* * * * *

UNITED STATES PATENT AND TRADEMARK OFFICE
CERTIFICATE OF CORRECTION

PATENT NO. : 4,078,683
DATED : March 14, 1978
INVENTOR(S) : Bobbie F. Hansen, Jr.

It is certified that error appears in the above-identified patent and that said Letters Patent are hereby corrected as shown below:

Column 2, line 7, delete "impentrable" and insert ---impenetrable---.

Column 3, line 47, delete "wall" and insert ---walls---.

Column 4, line 15, delete "are" and insert ---and---.

Column 6, line 11, delete "runs" and insert ---run---.

Column 7, line 50, delete "as" and insert ---an---.

Column 9, line 10, delete "receving" and insert ---receiving---.

Signed and Sealed this

Fourth Day of July 1978

[SEAL]

Attest:

RUTH C. MASON
Attesting Officer

DONALD W. BANNER
Commissioner of Patents and Trademarks